UNITED STATES PATENT OFFICE.

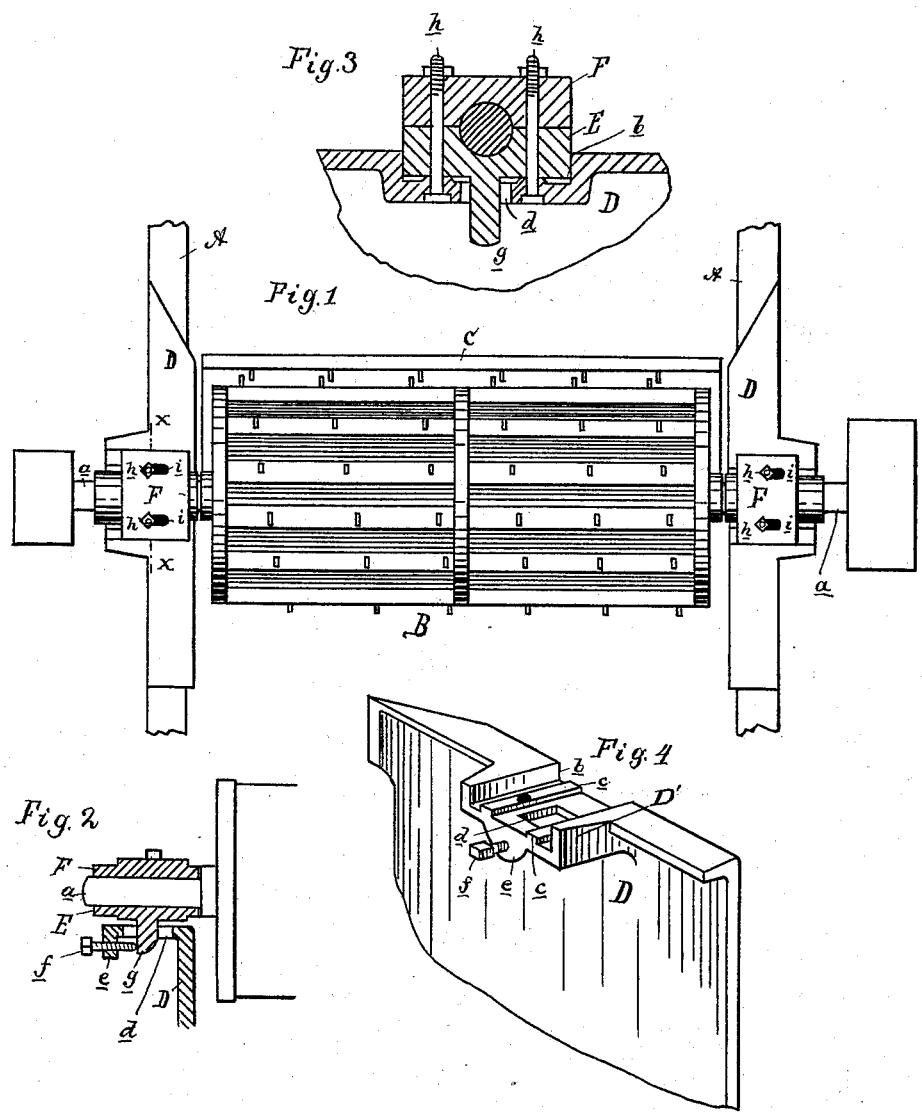

GEORGE A. ROBERTS AND CHRISTIAN SCHAFER, OF THREE RIVERS, MICHIGAN, ASSIGNORS TO CYRUS ROBERTS, OF SAME PLACE.

THRASHING-MACHINE.

SPECIFICATION forming part of Letters Patent No. 317,674, dated May 12, 1885.

Application filed October 10, 1884. (No model.)

*To all whom it may concern:*

Be it known that we, GEORGE A. ROBERTS and CHRISTIAN SCHAFER, of Three Rivers, in the county of St. Joseph and State of Michigan, have invented new and useful Improvements in Thrashing-Machines; and we do hereby declare that the following is a full, clear, and exact description thereof, reference being had to the accompanying drawings, which form a part of this specification.

This invention relates to certain new and useful improvements in the construction of thrashing-machines, by means of which a lateral adjustment of the cylinder in the concave may be had, but while at the same time any torsion of such cylinder in its bearings is prevented. Where the ends of the cylinder are supported in non-adjustable bearings, there is a tendency to torsion of the cylinder-shaft under the pull of the driving-belt, usually long and heavy, upon that end of the shaft, and a consequent tendency to vibration, lost motion, wear, and displacement of the parts, and where no provision is made for correcting this displacement the teeth of the cylinder are brought into contact with those of the concave, causing them to break off and fly out of the machine, injuring it and the operators; and it is the intention of this invention to provide means for avoiding these difficulties.

The invention consists in the construction of the various parts and their combination, as more fully hereinafter described.

Figure 1 is a top plan of sections of the side frame and concave, showing the cylinder and adjustable bearings in position. Fig. 2 is a vertical central longitudinal section through one of the bearings and journal of the concave. Fig. 3 is a transverse section of the same on the line of the hold-down bolt. Fig. 4 is an enlarged perspective view of a section of the side, showing the seat of the bearings.

In the accompanying drawings, which form a part of this specification, A A represent the sides of the frame, B the cylinder, and C the concave, of a thrashing-machine, which may be of any construction desired, the cylinder being provided with the usual journals, *a*.

D are metallic plates secured to the sides of the frame A, and these plates are provided with recesses *b*, the bottom of such recesses having upwardly-projecting ribs *c*, which are leveled off and form the base to support the bearing. Through the bottom of this recess, and in the overhanging part D' of this plate, there is a slot, *d*, for the purposes hereinafter described, and the inner face of the overhanging part of this plate D has a downwardly-projecting flange, *e*, through which a set-screw, *f*, passes. The two-part box, of which E is the journal-box proper, and F the cap thereof, is fitted into the recess *b*, resting upon the ribs *c* thereof, and the box E has cast integral with it, or otherwise secured to it, a downwardly-projecting lug, G, which passes through the slot *d* in the plate C. Bolts *h*, passing through the bottom of the recess *b*, and through slots *i*, coincident, in the box E and the cap F, secure these parts together; and to enable the bearings to be adjusted laterally the nuts upon the bolts H are loosened, when the set-screw *f* is employed to create the adjustment when the nuts are tightened up.

It will readily be seen that by the use of the adjustable boxes herein described any lost motion may be counteracted, and such lateral adjustment had as the circumstances of the case may require.

What I claim as my invention is—

1. The bearings E, provided with the downwardly-projecting lug *g*, in combination with the plate D, having the overhanging recessed portion D', apertured, as at *d*, to receive the lug *g*, and set-screw *f*, extending beyond the edges of said aperture and bearing upon the said lug *g*, as and for the purposes specified.

2. The bearings E, provided with the lug *g*, in combination with the plate D, having the overhanging recessed portion D', provided with ribs *c* and aperture *d*, flange *e*, projecting downwardly from the outer end of the portion D', and set-screw *f*, passing through said flange, the parts being constructed and arranged as and for the purposes specified.

GEORGE A. ROBERTS.
CHRISTIAN SCHAFER.

Witnesses:
MARVIN H. BUMPHREY,
F. J. FRENCH.